(12) United States Patent
Fürlinger

(10) Patent No.: US 11,109,590 B2
(45) Date of Patent: Sep. 7, 2021

(54) POTENTIATED ANTIMICROBIAL COMPOSITION FOR THE ANTIMICROBIAL TREATMENT OF BIOFILMS

(71) Applicant: CuraSolutions GmbH, Wiener Neustadt (AT)

(72) Inventor: Wolfgang Fürlinger, Wiener Neustadt (AT)

(73) Assignee: CuraSolutions GmbH, Vienna (AT)

( * ) Notice: Subject to any disclaimer, the term of this patent is extended or adjusted under 35 U.S.C. 154(b) by 0 days.

(21) Appl. No.: 16/482,193

(22) PCT Filed: Jan. 24, 2018

(86) PCT No.: PCT/EP2018/051620
§ 371 (c)(1),
(2) Date: Jul. 30, 2019

(87) PCT Pub. No.: WO2018/141591
PCT Pub. Date: Aug. 9, 2018

(65) Prior Publication Data
US 2019/0350198 A1    Nov. 21, 2019

(30) Foreign Application Priority Data

Jan. 31, 2017  (EP) .................................. 17153886

(51) Int. Cl.
| | | |
|---|---|---|
| *A01N 25/30* | (2006.01) | |
| *A01N 59/00* | (2006.01) | |
| *A01N 65/42* | (2009.01) | |
| *C02F 1/72* | (2006.01) | |
| *C02F 1/76* | (2006.01) | |
| *C02F 103/02* | (2006.01) | |

(52) U.S. Cl.
CPC ............. *A01N 25/30* (2013.01); *A01N 59/00* (2013.01); *A01N 65/42* (2013.01); *C02F 1/722* (2013.01); *C02F 1/76* (2013.01); *C02F 2103/023* (2013.01); *C02F 2103/026* (2013.01); *C02F 2303/04* (2013.01); *C02F 2303/20* (2013.01); *C02F 2305/04* (2013.01)

(58) Field of Classification Search
CPC ........ A61K 8/22; A61K 31/327; A61K 8/365; C02F 2303/04
See application file for complete search history.

(56) References Cited

U.S. PATENT DOCUMENTS

| | | | |
|---|---|---|---|
| 2009/0311394 A1 | 12/2009 | Kirchner et al. | |
| 2011/0027382 A1 | 2/2011 | Modi | |
| 2014/0242198 A1* | 8/2014 | Modak | A01N 59/00 424/736 |

FOREIGN PATENT DOCUMENTS

| | | | | |
|---|---|---|---|---|
| DE | 102012103767 A1 * | 10/2013 | ............. | A01N 65/00 |
| DE | 102012103767 A1 | 10/2013 | | |
| EP | 0842606 A1 | 5/1998 | | |
| EP | 0842606 B1 * | 3/2000 | ............. | A01N 65/00 |
| WO | 2015/072988 A1 | 5/2015 | | |
| WO | WO-2015088309 A1 * | 6/2015 | ............. | A23B 7/154 |

OTHER PUBLICATIONS

Callewaert et al (Frontiers in Microbiology, 2015, vol. 6, pp. 1-11) (Year: 2015).*
DE-102012103767-A1 (Espacenet English translation, downloaded Aug. 2020) (Year: 2020).*
WO-2015088309-A1 (WIPO English translation, downloaded Aug. 2020) (Year: 2020).*
European Search Report, for European Application No. 17153886, dated Mar. 10, 2017 (1 page).

* cited by examiner

*Primary Examiner* — Mark V Stevens
(74) *Attorney, Agent, or Firm* — Eversheds Sutherland (US) LLP

(57) ABSTRACT

The invention relates to the use of a composition for the antimicrobial and/or antioxidative treatment of biofilms in water-containing liquids, comprising: (a) a micelle-forming solubilizate which comprises at least one plant extract, at least one emulsifier with an HLB number of 8 to 18, and water, and (b) at least one biodegradable antimicrobial agent selected from the group consisting of peroxides, including peroxycarboxylic acids and $H_2O_2$, hypochlorites, hypochlorous acid and a combination thereof.

23 Claims, No Drawings

POTENTIATED ANTIMICROBIAL COMPOSITION FOR THE ANTIMICROBIAL TREATMENT OF BIOFILMS

The invention relates to the use of a composition for the antimicrobial and/or antioxidative treatment of biofilms in water-containing liquids. The invention also relates to a novel composition with potentiated efficiency for the antimicrobial and/or antioxidative treatment of biofilms in water-containing liquids.

The invention additionally relates to a method for the antimicrobial and/or antioxidative treatment of biofilms in water-containing liquids, in particular for combatting and for preventing the growth of biofilm-forming microorganisms in water-containing liquids by means of the composition described herein.

Merely 5% of the microorganisms present in liquid media, such as bacteria, fungi or protozoa, are present in planktonic form. The majority of these microorganisms live in sessile form on surface structures and under certain ambient conditions form biofilms in the form of slimy deposits, in which they remain metabolically active and by which they are protected against physical and chemical noxae.

Biofilms consist of extracellular polymeric substances (EPS) formed by bacteria and, in addition to the microorganisms themselves, also contain water and organic and inorganic compounds. Biofilms offer protection to the individual microorganisms and allow them to adjust to altered ambient conditions, such as fluctuations in pH value or temperature, or prevent contact with substances that are toxic for microorganisms as a result of hindered penetration of antimicrobial active substances through the biofilm to the microorganisms. It is thus known that, in relation to microorganisms embedded in the biofilm in comparison to planktonic forms, 2 to 3 $\log_{10}$ higher concentrations of antimicrobial active substances and in some circumstances considerably extended exposure times are required for a comparatively similarly high antimicrobial effect (see for example Bridier, A. et al., Antimicrob Agents Chemother 2011; 55: 2648-54).

A problem that occurs frequently in water-containing systems is the growth of microorganisms and the resultant formation of slimy biofilm deposits at the interfaces of these water-containing systems. Biofilm deposits are used particularly frequently in industrial, technical, medical and commercial water-containing systems, such as in cooling water systems of cooling towers or in water-conducting elements of medical technology installations, but also in water-containing systems for recreational purposes or in fountains, and lead there to undesirable microbial contaminations. Without an efficient and lasting antimicrobial treatment to eliminate the microorganisms or the biofilms, problems occur such as deterioration of the process cooling of cooling towers and cooling installations, sanitary problems in medical technology installations or foodstuff installations, or aesthetic/sanitary problems in swimming pools and fountains. Due to these problems, a large number of antimicrobial substances or compositions, systems for water disinfection, and methods for eliminating and controlling microbial growth have been developed.

DE 10 2005 027 347 A1 describes a method for producing an antimicrobially acting coating on a technical surface, in which a solution of polyvinyl acetate, a preservative and a solvent is produced, the solution is applied to the technical surface, and is dried, thus forming the coating. The preservative is selected from benzoic acid, sorbic acid, natamycin, bacteriocins and plant extract. This method, however, is not suitable for admixing into water-containing liquids.

DE 10 2005 032 352 A1 discloses a solubilizate of an active substance concentrate, which can be a St John's wort extract, a Reseda extract, or a tarragon extract, with an emulsifier and water. The solubilizate is intended to improve the bioavailability of the active substance or the water-insoluble active substance in foodstuffs. There is no mention of an application in water-containing liquids.

DE 10 2012 103 767 A1 discloses the use of a solubilizate on the basis of micellated plant extracts for the treatment of room air, foodstuffs, surfaces, and for the production of coating materials. There is no mention of an application in water-containing liquids.

US 2011/0151034 A1 describes an antimicrobial agent against gram-positive bacteria based on labiate extracts, wherein emulsifiers can also be added.

DE 102 13 031 A1 discloses the use of extracts of the olive tree in washing agents, detergents, and cleaning agents.

WO 2008/017580 A1 relates to antimicrobial micelles for foodstuff applications.

EP 0 842 606 A1, WO 2015/072988 and US 2011/027382 A1 each describe antimicrobial solubilizates based on micellated plant extracts, but do not describe the use of these solubilizates for the treatment of biofilms in water-containing liquids.

Many of the available antimicrobially acting substances, agents and preservatives are produced synthetically for reasons of chemical purity, are costly to produce, are not biodegradable, or are classed as ecologically dubious, which often causes toxicological or ecological concerns for users, who reject them. There is thus an increasing need for natural, ecologically and economically advantageous active substances. Natural active substances of this kind, however, are very poorly soluble in water, usually have an intense off-smell or off-taste, and can only badly penetrate biofilms in application-possible concentrations, or cannot penetrate them at all. (see for example Stewart, P. S. Microbiol Spectr 2015; 3:1-30).

The object of the invention is to provide a composition with potentiated efficiency which is suitable for use in the antimicrobial and/or antioxidative treatment of biofilms in water-containing liquids and which demonstrates a significantly improved effect with regard to eliminating and controlling microbial growth in biofilms in water-containing liquids and water-conducting systems. At the same time the composition with potentiated efficiency should have ecological and economical advantages.

A further object of the invention lies in providing an improved method for the antimicrobial and/or antioxidative treatment of biofilms in water-containing liquids.

This object is achieved by the use of a composition as described at the outset, wherein the composition comprises:
  (a) a micelle-forming solubilizate which comprises at least one plant extract, at least one emulsifier with an HLB value of 8 to 18, and water, and
  (b) at least one biodegradable antimicrobial active substance selected from the group consisting of peroxides, including peroxycarboxylic acids and $H_2O_2$, hypochlorites, hypochlorous acid and a combination thereof.

Peroxides, in particular $H_2O_2$, hypochlorites, and hypochlorous acids have been used for many years in the conventional manner for water treatment in technical installations. However, these compounds are extremely volatile and efficient biofilm degradation is not possible with these compounds alone.

Antimicrobial micelle-forming solubilizates which comprise at least one plant extract, at least one emulsifier with an HLB value of 8 to 18, and water are also known from the prior art. Micelle-forming solubilizates of this kind have been described in detail for example in the above-mentioned publications DE 10 2012 103 767 A1, US 2011/0151034 A1 and DE 102 13 031 A1, EP 0 842 606 A1, WO 2015/072988 and US 2011/027382 A1. As already mentioned above, none of these documents describes the use of these solubilizates for the treatment of biofilms in water-containing liquids.

The applicant, or rather the inventor, found, surprisingly, that the use of a combination of such micelle-forming solubilizates with an antimicrobial active substance from the group of peroxides, hypochlorites, and hypochlorous acids has an unexpectedly high increased efficacy in relation to microorganisms, in particular in relation to biofilm-forming microorganisms and microorganisms in biofilms, which significantly exceeds the anticipated additive antimicrobial effect of the individual components. This unforeseeable increased effect of the compositions described herein is described in greater detail in the accompanying experimental results and comparative tests (see Example 1 and Example 2 further below).

This object is additionally achieved by a novel composition, said composition comprising: (a) a micelle-forming solubilizate comprising at least one plant extract, at least one emulsifier with an HLB value of 8 to 18, and water, (b) at least one biodegradable antimicrobial active substance selected from the group consisting of peroxides, including peroxycarboxylic acids and $H_2O_2$, hypochlorites, hypochlorous acid, and a combination thereof, and (c) fruit acid. The specific combination of the individual components of this composition is not disclosed in detail or suggested in any of the publications cited herein, and by way of experimental tests demonstrated an unexpectedly high increased antimicrobial efficacy in comparison to the known compositions.

Thanks to the invention not only is a significantly improved antimicrobial effect achieved, but in addition ecological and economical advantages are attained on account of the reduced application concentrations and/or exposure times. The composition according to the invention is highly efficient in respect of its antimicrobial efficacy in relation to biofilm-forming microorganisms or in relation to biofilms in a water-containing liquid, is ecologically safe, and can be used economically, which is advantageous in particular for commercial-scale and large industrial water-containing systems.

Without wishing to be tied to a scientific theory, it is alleged that the combination of micelle-forming solubilizate and the biodegradable antimicrobial active substance selected from the group consisting of peroxides, including peroxycarboxylic acids and $H_2O_2$, hypchlorites, hypochlorous acid, and a combination thereof, leads to the micellation of the biodegradable antimicrobial active substance, and therefore the mixture distributes well in the aqueous phase and in addition passes through the corresponding layers of biofilm, whereby, ultimately, good contact with microorganisms can be achieved. Microorganisms or biofilms to be treated can thus be brought into contact with the biodegradable antimicrobial active substance and made safe with better efficacy than by means of known measures or methods. In the case of the use according to the invention of the composition for the microbially inhibiting or reducing treatment of biofilms in water-containing liquids, it can also be ensured by the use of the biodegradable antimicrobial active substance that, amongst other things, the active substance after its release on the cell wall of microorganisms can penetrate into cell compartments optimally, which in a non-micellated form would not be achievable or would only be achievable with difficulty on account of its chemical and physical nature, for example lipophilicity. Thus, in many applications, lower concentrations of the micellated active substance or shorter exposure times are used, with comparable or better effect as compared to existing applications.

The term "micellation" as used herein denotes a method for packaging substances, for example antimicrobially active raw and active substances, in synthetic micelles by means of emulsifiers and water. The micelles serve as a carrier medium for the packaged active substance or the packaged active substances. The method substantially follows the model in nature with regard to the creation of micellated structures. Micelles with diameters in the double-digit nanometre range can be found for example in hens' eggs or in milk. However, the human organism also continuously produces micelles with use of the gall bladder for example, so as to be able to absorb and/or metabolize fat-soluble substances, for example vitamins A, D, E and K, in the body. The solubilizates of nano-size micelles usually form clear solutions in water. The micelles are thermally and mechanically relatively stable and microbiologically and toxically safe in comparison to conventional formulations and microencapsulations. They advantageously enable the applications described herein for active substances that otherwise would have been transportable only with difficultly, or previously would not have been transportable to the site of action.

The HLB value (HLB=hydrophilic-lipophilic balance) is a routine parameter in specialist circles and describes the hydrophilic and lipophilic proportion of the used emulsifier molecules. In accordance with the invention the HLB value is the value determined by the method according to W. C. Griffin on a scale of from 1 to 20. An HLB value of 1 represents a lipophilic compound; a chemical compound with an HLB value of 20 has a high hydrophilic fraction. A value of approximately 3 to 8 is associated with W/O emulsifiers; a value of approximately 8 to 18 is associated with O/W emulsifiers.

With the use of the compositions described herein for the microbially inhibiting or reducing treatment of biofilms in water-containing liquids, these are mixed as appropriate with further solvents, such as citric acid, and are expediently applied in or to water in an application form suitable for this purpose.

The term "aqueous liquid" in conjunction with the invention is understood to mean any type of liquid of which the main constituent is water, for example industrial process waters, such as cooling water, circuit water, process solutions for the biotechnology and food technology sectors, river water and sea water, wastewater and purified wastewater, etc.

The term "biofilm" as used herein is a specialist term established in specialist circles; reference is made at this juncture to the above explanations of biofilms in aqueous media.

The biodegradable antimicrobial active substance is preferably $H_2O_2$ (hydrogen peroxide). $H_2O_2$ has been used for many years for water treatment and for disinfection in technical installations, is available economically in large amounts, has a pronounced oxidative and antimicrobial efficacy, and high environmental compatibility.

In an advantageous development, the composition can also comprise a fruit acid, such as lactic acid, in particular L(+) lactic acid, malic acid, citric acid or oxalic acid. The composition, however, preferably comprises L(+) lactic acid, since this (in contrast for example to D(−) lactic acid) is metabolized and therefore completely broken down by almost all microorganisms present in the environment.

In a particularly advantageous variant of the invention the composition comprises $H_2O_2$ as biodegradable antimicrobial active substance, and additionally L(+) lactic acid.

In a preferred variant of the composition according to the invention the emulsifier comprises at least 80% by weight of polysorbates, preferably polyoxyethylene (20) sorbitan monolaurate (polysorbate 20) and/or polyoxyethylene (20) sorbitan monooleate (polysorbate 80).

In a variant the micelle-forming solubilizate of the composition according to the invention preferably contains 5 to % by weight of plant extract, 30 to 85% by weight of emulsifier, and 10 to 40% by weight of water. Preferably, the weight ratio of plant extract to water is approximately 30:35 and the weight ratio of plant extract to emulsifier is approximately 30:35.

If the biodegradable antimicrobial active substance is hydrogen peroxide, this is preferably contained in the composition in an amount of 13 to 19% by weight.

In another variant the composition according to the invention can contain 13 to 19% by weight of $H_2O_2$ and 1 to 2.5% by weight of L(+) lactic acid.

In a further advantageous variant the composition according to the invention comprises the micelle-forming solubilizate with 5 to 40% by weight of plant extract, 30 to 85% by weight of emulsifier, and 10 to 40% by weight of water, and, as biodegradable antimicrobial active substance, 13 to 19% by weight $H_2O_2$ and additionally also 1 to 2.5% by weight of L(+) lactic acid. Preferably, the weight ratio of plant extract to water is approximately 30:35 and the weight ratio of plant extract to emulsifier is approximately 30:35.

With regard to the amount of biodegradable antimicrobial active substance contained in the composition, it must be said that if the proportion is too low, the ratio of antimicrobial active substance to carrier material (emulsifier and water) can be too low, and therefore a sufficient antimicrobial effect is no longer ensured. An excessively high fraction of the antimicrobial active substance or an excessively low fraction of the emulsifier in the composition can have the result that the micelles do not form or are unstable. A person skilled in the art, however, on the basis of simple routine tests, will be easily able to select the appropriate amounts of the components of the composition according to the invention for the specific uses and requirements and to optimize these accordingly.

As already mentioned above, micelle-forming solubilizates as are used in the present application have been described in detail in the above-mentioned prior publications DE 10 2012 103 767 A1, US 2011/0151034 A1 and DE 102 13 031 A1. In particular, reference is made here to DE 10 2012 103 767 A1, in accordance with which the plant extracts described therein can also be used for the present invention.

Accordingly and under consideration of DE 10 2012 103 767 A1, the terms "plant extract" and "phytoextract" used herein synonymously refer, in the sense of the present invention, to an extract or a mixture of extracts from spice plants and/or citrus plants or parts of such plants or parts of other plants occurring in nature. The term phytoextract or plant extract also comprises constituents or fractions of the aforementioned extracts, for example by specific solvents or by distillation of extracts or fractions obtained from the raw extracts. Plant extracts which themselves have a certain antimicrobial effect can also be used. An overview of plant extracts having an antimicrobial effect that can be used in accordance with the invention is described by the following articles: a) Rios, J. L., Recio, M. C. Medical plants and antimicrobial activity; J Ethnopharmacol 2005; 100:80-4; b) Burt, S. Essential Oils: their antibacterial properties and potential applications in foods—a review; Int J Food Microbiol 2000; 94:223-53; c) Keyal, U., I luang, X, Bhatta, A. K. Antifungal effect of plant extract and essential oil. Chin J Integr Med 2016, DOI: 10.1007/s11655-016-2524-z; d) Bacha, K., Tariki, Y., Gebreyesus, F., Zerihun, S., Mohammed, A., Weiland-Bräuer, N., Schmitz, R. A., Mulat, M. Antimicrobial and anti-Quorum sensing activities of selected medical plants of Ethiopia: Implication for development of potent antimicrobial agents. BMC Microbiol 2016; 16:139; e) Cascaes, M. M., Guihon, G. M., Andrade, E. Fl., Zoghbi, M. D., Santos Lda, S. Constituents and pharmacological activities of Myrcia (Myrtaceae): A review of an aromatic and medicinal group of plants. Int J Mol Sei 2015; 16:23881-904; f) Kramer, A., Assadian, 0. (H rsg.) Wallhaußers Praxis der Sterilisation, Desinfektion and Antiseptik. 6th edition, 2009, Georg Thieme Verlag, Stuttgart. Chapter 70, p. 887-891.

The plant extracts (phytoextracts, phytoderivatives) cited in the above-mentioned literature are not an exhaustive representation of the plant extracts usable in accordance with the invention, but instead are merely examples of suitable plant extracts. A person skilled in the art, on the basis of simple routine tests, will be able to select one or more plant extracts suitable for the intended application from the available plant extracts and with use of the tests and property descriptions published for the relevant plant extracts.

Plant parts from which plant extracts are produced in the sense of the present invention include, but are not limited to, whole plants, roots, stalks, stems, branches, leaves, flowers, flower heads, seeds, fruits and parts of fruits. Further suitable plant parts can be found, for example, in the references listed above.

The plant extract is preferably selected from the group consisting of extracts from spice plants or parts thereof, extracts from citrus plants or parts thereof, and from combinations of these extracts.

Spice plants from which plant extracts in the sense of the present invention are produced include, but are not limited to, onions, garlic, olives, rosemary, kitchen herbs, bay leaves, saffron, cloves, capers, cinnamon, ginger, horseradish, nutmeg, pepper, paprika, juniper berries, vanilla, cumin, anise, cacao, cloves, chili, sour orange, fennel, guarana, cola nut and sage. Further suitable plant parts can be found, for example, in the references listed above.

Citrus plants from which plant extracts are produced in the sense of the present invention include, but are not limited to, citron, lemon, lime, orange, mandarin, clementine, grapefruit, bergamot, kumquat, limequat, tangelo, pomelo, satsuma, tangerine, orantique, bitter orange, ugli fruit. Further suitable plants can be found, for example, in the references listed above.

Plant extracts of spice or citrus plants of the type used in the invention are generally known. They are basically substance mixtures which vary in their composition depending on the used plants and plant parts, their growth stages and the used extraction methods. A specific and conclusive naming of the individual compounds contained in a plant extract is therefore neither possible nor expedient in the sense of the present invention, and would not do justice to the invention. Plant extract in the sense of the present invention contains predominantly lipophilic compounds. Plant extracts of crop, spice or citrus plants of the type used in the invention are known to the experts and commercially available, for example from the company Cognis GmbH, Dusseldorf, Germany, product Cegemett Fresh, or from the company Procena GmbH, Illertissen, Germany, product ProExtrakt P150.

The plant extract, however, is particularly preferably derived from olives, garlic, onions and/or citrus fruits. An example of a commercially available plant extract comprising plant extracts from olives, garlic, onions and citrus fruits is the product ProExtrakt P150 from the company Procena GmbH, Germany.

Plant extracts in the sense of the present invention can be produced by known methods. Examples of the production of plant extracts include, but are not limited to, extraction with organic solvents, such as ethanol, methanol, chloroform or acetone. Other suitable extraction methods can be found, for example, in the above-mentioned references and further references therein.

Advantageously, the micelles have an average diameter of 1 to 100 nm, preferably from 3 to 50 nm, particularly preferably from 5 to 20 nm. If the micelles are too large, the advantages described above in the various applications may not be able to be achieved. If, however, they are too small, they cannot absorb biodegradable antimicrobial active substance, or do not absorb enough of it.

A further subject of the invention relates to, as mentioned at the outset, a method for the antimicrobial and/or antioxidative treatment of biofilms in water-containing liquids, especially for combatting and preventing the growth of gram-positive and gram-negative bacteria, fungi and/or protozoa of biofilms in water-containing liquids, wherein in accordance with the invention the method comprises the introduction of an effective amount of a composition according to the invention, as described and defined in this disclosure, into the water-containing liquid in which the biofilm to be treated is present. The expression "introduction into the water-containing liquid" is understood to mean all possible ways of contacting the composition with the water-containing liquid, for example by adding the composition to the water-containing liquid, or by applying the composition to the water-containing liquid.

The term "effective amount of a composition according to the invention" is used herein to refer to any amount of the composition which has an antimicrobial and/or antioxidant efficacy in relation to microorganisms and makes possible a combatting (in the form of an inhibition/killing) or a prevention of the growth of microorganisms, particularly gram-positive and gram-negative bacteria, fungi and/or protozoa, in biofilms when it is brought into contact with the liquid to be treated or the biofilm. The amount of the composition is dependent on the particular application, the dimensions and geometry of the water-conducting system to be treated (for example the arrangement, the diameter and the length of the water-conducting cooling conduits), the type of water to be treated (for example process water, wastewater), the degree of the microbial loading, and the nature and composition of the present microorganisms. In some applications a one-time addition of the composition at appropriate intervals may be adequate, while in other applications a close repetition of the addition over a certain period of time is necessary. The appropriate amount can be identified without difficulty by a person skilled in the art and can be determined and optimized experimentally by means of simple routine tests.

The method may provide, in particular, that the composition is introduced into a water-conducting conduit containing the biofilm, in particular a cooling water conduit (for example a cooling water conduit of a cooling tower).

In accordance with the above details, the invention described herein relates to the use of an antimicrobial composition, as described and defined in this disclosure, for the antimicrobial and/or antioxidant treatment of biofilm in a water-containing liquid biofilm. The water-containing liquid is not a human or animal bodily fluid.

Preferably, the aqueous liquid is selected from the group consisting of process water, wastewater, surface water and fill-up water.

The term "surface water" relates particularly, but not exclusively, to river water and lake water in which the number of occurring microorganisms is to be reduced or kept stable, or in which the formation of biofilm is to be delayed.

The term "wastewater" includes not only waste water in the strict sense, but also purified wastewater or treated wastewater (clear water) in which occurring biofilms are to be treated.

The term "process water" (often also referred to as utility water, service water or industrial water) refers primarily to water used in technical, medical, industrial or commercial installations. This includes, for example, cooling water in medical technology devices such as rotary drill bits or saws, or cooling water in heater-cooling units for cooling/warming patients during surgical interventions or for temperature control of critically ill patients.

In one embodiment the process water is present as cooling water in a cooling water system, in particular in a cooling water system for cooling towers, or is treated for use in a cooling water system, especially in a cooling water system for cooling towers. In the exchange process the system is emptied, and afterwards the composition according to the invention (premixed with water) is introduced at the base of the particular installation by means of a pump. In the injection process the composition according to the invention is permanently admixed to the cooling or process water via an injection point for the duration of the application.

In another embodiment the process water is present in water-conducting elements of beer brewing installations, circulating coolers and/or draft dispensers, or is treated for use in beer brewing installations, circulating coolers and/or draft dispensers.

In yet another embodiment, the process water is present in water-conducting elements of medical technology installations or is treated for use in medical technology installations. The use can relate here to the antimicrobial treatment of water in, for example, dental units (drill bit cooling water and flushing water, but not patient drinking water of a dental unit), cooling water for rotating medical instruments, or heater-cooling units for cooling/heating of patients during surgical interventions or temperature control of critically ill patients.

The term "fill-up water" can mean, in particular, fill-up water for water basins (for example fountains, recreational and sports facilities, such as spas, swimming baths and pools), for water tanks (for example water tanks in planes, trains, recreational vehicles, etc.), for domestic water conduits and for hot water circuits.

The composition according to the invention is for example obtainable by a method comprising the following steps:

a) mixing the at least one plant extract with water at about 45 to 50° C.;
b) adding the at least one emulsifier having an HLB value of 8 to 18 and heated to preferably about 50° C. to the mixture of plant extract and water;

c) heating the mixture of plant extract, water and emulsifier, preferably to about 90° C., and homogenizing the mixture until the micelle-forming solubilizate is formed;

d) adding at least one biodegradable antimicrobial agent, which is selected from the group consisting of peroxides, including peroxycarboxylic acids and $H_2O_2$, hypochlorite, hypochlorous acid and a combination thereof, and preferably $H_2O_2$; and e) optionally adding a fruit acid, preferably L(+) lactic acid.

The invention and its advantages, especially its antimicrobial (biocidal) efficacy, will be explained in greater detail below with reference to examples.

EXAMPLE 1: PRODUCTION OF AN ANTIMICROBIAL COMPOSITION USING A MICELLE-FORMING SOLUBILIZATE

ProExtrakt P150 from the company Procena GmbH, Germany, which contains a mixture of plant extracts from olives, garlic, onions and citrus fruits as well as glycerol (E 422) and vitamin C (ascorbic acid, E 300), was used as plant extract. It is known that olives, garlic, onions and citrus fruits contain substances that, besides antioxidant properties, also possess antimicrobial activity directed against bacteria, yeasts and fungi. Known active substances are for example oleuropein in olives and allicin in garlic.

For the production of the antimicrobial potentiated composition according to the invention, 30% by weight of ProExtrakt P150 were mixed with 35% by weight of water at about 45 to 50° C., and this mixture was stirred into 35% by weight of the emulsifier polysorbate 80 (Novasol Item No. EW0240/2, Aquanova AG, 64295 Darmstadt, DE; E number: E 433) heated to about 50° C. The preparation obtained was subsequently heated to about 90° C. and homogenized until the desired oil- and water-soluble micelle-forming solubilizate was obtained. Subsequently, in this example, the biodegradable antimicrobial active substance $H_2O_2$ (hydrogen peroxide; IBEN Mikro Stop GmbH, 27572 Bremerhaven, DE) in an amount of 15 to 19 vol. % and, for additional active substance enhancement, additionally L(+) lactic acid (IBEN Mikro Stop GmbH, 27572 Bremerhaven, DE) in an amount of 2 to 2.5 vol. %, and optionally additional water were added, wherein a antimicrobial composition with potentiated efficiency for use in the present invention was obtained, which can be used for the treatment of water by introduction into or application to water, such as, nut not exclusively, drinking water, wastewater, process water, or surface water. The micelles which are contained in the composition obtained by this method have a size of about 3-50 nm, preferably 5-20 nm. Under the above-described conditions, micelles in the specified size ranges form automatically, wherein the sizes of the micelles can be readily set or optimized by a person skilled in the art.

EXAMPLE 2—ANTIMICROBIAL EFFICACY OF THE ANTIMICROBIAL COMPOSITION USED IN ACCORDANCE WITH THE INVENTION IN SIMULATED COOLING WATER

Sample solutions of 0.1% by weight, 0.25% by weight, 0.5% by weight, 1% by weight, 2.5% by weight, 5% by weight, and 10% by weight of the composition described in Example 1 were examined in accredited microbiological laboratories in Germany in accordance with DIN EN 13623: 2010 in comparison to water of standardized hardness (WSH) as control, an aqueous 7.5% $H_2O_2$ (hydrogen peroxide; 50% solution of a 15 vol. % $H_2O_2$ stock solution in water) as control, an aqueous 1% polysorbate 80 solution as control, a 20% aqueous plant extract solution as control, and a 20% aqueous solution of the functionalized plant extract (micelle-forming solubilizate) as control against the biofilm-forming bacterium *Legionella pneumophilia* (ATCC 33152) in an aqueous environment at pH 8.0 with addition of 0.005% yeast extract for simulating cooling water with exposure times of 15 min, 30 min, 60 min and 120 min.

The measurement results of the antimicrobial effect of WSH, an aqueous 7.5% $H_2O_2$ solution alone, the plant extract ProExtrakt P150 alone, the emulsifier polysorbate 80 alone, the functionalized plant extract (micelle-forming solubilizate) alone and different dilutions of the composition according to the invention are shown below in Table 1.

TABLE 1

Potentiated antimicrobial effectiveness of a composition according to the invention ($H_2O_2$ and L(+) lactic acid in aqueous medium in combination with a micelle-forming solubilizate):

| Test Substance | Function | 15 min | 30 min | 60 min | 120 min |
|---|---|---|---|---|---|
| WSH | Control | 0.07 | 0.08 | 0.08 | 0.10 |
| 7.50% $H_2O_2$ | Control | 2.24 | 3.44 | 4.25 | 4.83 |
| 1% PSb 80 | Control | 0.06 | 0.09 | 0.09 | 0.11 |
| 20% PE | Control | 0.76 | 0.92 | 1.24 | 1.27 |
| 20% fPE | Control | 0.80 | 0.95 | 1.30 | 1.25 |
| 10.00% PAM | Intervention | >5.56 | >5.56 | >5.56 | >5.56 |
| 5.00% PAM | Intervention | >5.56 | >5.56 | >5.56 | >5.56 |
| 2.50% PAM | Intervention | >5.56 | >5.56 | >5.56 | >5.56 |
| 1.00% PAM | Intervention | >5.55 | >5.56 | >5.56 | >5.56 |
| 0.50% PAM | Intervention | 4.56 | <5.55 | <5.55 | n.p. |
| 0.25% PAM | Intervention | <3.18 | <5.55 | <5.55 | n.p. |
| 0.10% PAM | Intervention | <2.88 | <2.88 | <2.88 | n.p. |

Results presented as $Log_{10}$) reduction factor in relation to *L. pneumophilia* (ATCC 33152); n.p.=not performed; WSH=water of standardised hardness; PSb 80=polysorbate 80; PE=phytoextract (P150); fPE=functionalised phytoextract (=micelle-forming solubilizate); PAM=Potentiated antimicrobial mixture The results clearly show that, compared to WSH, which as expected did not demonstrate an antimicrobial effect, the antimicrobial effect of $H_2O_2$ is increased by packaging in micelles formed from functionalised phytoextracts and lactic acid as compared to $H_2O_2$ alone or as compared to the controls. This phenomenon is also effective against the bacterium *L. pneumophilia* in cooling water, as is used for example in industrial cooling towers, said bacterium occurring in water and forming a biofilm.

The results of the tests show that, by application of a potentiated antimicrobial active substance or active substance mixture by means of micelle-forming solubilizates based on plant extract/emulsifier, the application concentrations and/or exposure times of existing known antimicrobial substances in water for the purposes of antimicrobial treatment of water can be reduced by introduction into, or application to water, for example, but not exclusively, drinking water, wastewater, process water or surface water.

The results additionally show that even all dilution stages of the composition according to the invention have an improved effect against *L. pneumophilia* in simulated cooling water, for the majority of all tested concentrations and exposure times. In the examined samples the corresponding non-micellated antimicrobial test sample by contrast did not demonstrate an improved effect in relation to the micellated test sample.

EXAMPLE 3—ANTIMICROBIAL EFFICACY OF THE ANTIMICROBIAL COMPOSITION USED IN ACCORDANCE WITH THE INVENTION IN BIOFILM In order to determine the antimicrobial efficacy of the potentiated antimicrobial active substance or active substance mixture by means of micelle-forming solubilizates based on plant extract/emulsifier in relation to bacteria in biofilm, the effect of water of standardised hardness (WSH), an aqueous 17% $H_2O_2$ solution, and a 1.7% $H_2O_2$ solution (1:10) alone, the plant extract ProExtrakt P150 in a 0.3% dilution alone, 2% lactic acid alone, and an undiluted and a 1:10 diluted solution of the antimicrobial composition described above in Example 1 and in Example 2 and used in accordance with the invention was examined. The results are shown below in Table 2.

TABLE 2

Potentiated antimicrobial effectiveness of a composition used in accordance with the invention ($H_2O_2$ and L(+) lactic acid in aqueous medium in combination with a micelle-forming solubilizate; for production see Example 1) in relation to *P. aeruginosa* in biofilm (starting number: > 8 $\log_{10}$ $cfu/cm^2$):

| Test Substance | Function | 5 min | 15 min | 30 min | 60 min |
|---|---|---|---|---|---|
| WSH | Control | 0.03 | 0.06 | 0.05 | 0.07 |
| 1.7% $H_2O_2$ | Control | 0.84 | 1.62 | 1.95 | 2.53 |
| 17% $H_2O_2$ | Control | >8.00 | >8.00 | >8.00 | >8.00 |
| 0.3% fPE | Control | 0.64 | 0.56 | 0.73 | 0.78 |
| 2% MS | Control | 3.45 | 3.85 | 4.25 | 4.40 |
| 100% PAM | Intervention | >8.00 | >8.00 | >8.00 | >8.00 |
| 10.00% PAM | Intervention | 7.85 | >8.00 | >8.00 | >8.00 |

Results presented as $\text{Log}_{10}$) reduction factor in relation to *P. aeruginosa* (PA01); WSH=water of standardised hardness; fPE=functionalised phytoextract (=micelle-forming solubilizate); MS=L(+) lactic acid; PAM=Potentiated antimicrobial mixture according to the invention.

The results show that, in comparison to WSH, which as expected did not demonstrate an antimicrobial effect in relation to *P. aeruginosa* in biofilm 24 hours old, both a 17% $H_2O_2$ solution and an undiluted solution of 17% $H_2O_2$ demonstrate, after just 5 minutes of exposure time, a high antimicrobial effect in relation to the test organisms in biofilms 24 hours old by packaging in micelles formed from functionalised phytoextracts (=100% PAM) and lactic acid.

The individual constituents 0.3% fPE and 2% MS themselves had no antimicrobial effect in relation to the test organisms in biofilms.

With a 1:10 dilution of 17% $H_2O_2$ (=1.7% $H_2O_2$) or a 1:10 dilution of 17% $H_2O_2$ by means of packaging in micelles formed from functionalised phytoextracts and lactic acid (=10% PAM), an antimicrobial difference of more than 5.47 to 7.01 $\log_{10}$ cfu reduction was visible within 5 to 60 minutes of exposure time with application of 1.7% $H_2O_2$ by packaging in micelles formed from functionalised phytoextracts and lactic acid (=10% PAM), which demonstrated an antimicrobial potentiation.

To summarise, the results show that the antimicrobial efficacy of 17% $H_2O_2$ and of 100% PAM (containing 17% $H_2O_2$) in relation to biofilms is considered to be high and substantially equivalent. The antimicrobial effect of this high concentration of $H_2O_2$ is not surprising per se.

The results with a much lower concentrated hydrogen peroxide solution, specifically 1.7% $H_2O_2$, demonstrated a significant loss of antimicrobial efficacy in biofilms compared to 17% $H_2O_2$ and 100% PAM. Surprisingly, however, a high antimicrobial efficacy in biofilms, comparable to that of highly dosed 17% $H_2O_2$ or 100% PAM, was determined for the diluted 10% PAM (containing 1.7% $H_2O_2$). With an already low concentration of the composition according to the invention (see result for 10% PAM), a high antimicrobial efficacy in relation to biofilms is thus achieved, which at the same time entails ecological and economical advantages and in practical use poses a very low risk potential for the user.

LITERATURE

Bacha, K., Tariki, Y., Gebreyesus, F., Zerihun, S., Mohammed, A., Weiland-Bräuer, N., Schmitz, R. A., Mulat, M. Antimicrobial and anti-Quorum sensing activities of selected medica 1 plants of Ethiopia: Implication for development of potent antimicrobial agents. BMC Microbiol 2016; 16:139.

Bridier, A., Dubois-Brissonnet, F., Greub, G., Thomas, V., Briandet, R. Dynamics of the action of biocides in *Pseudomonas aeruginosa* Biofilms. Antimicrob Agents Chemother 2011; 55:2648-54.

Burt, S. Essential Oils: their antibacterial properties and potential applications in foods—a review; Int J Food Microbiol 2000; 94:223-53.

Cascaes, M. M., Guihon, G. M., Andrade, E. H., Zoghbi, M. D., Santos Lda, S. Constituents and pharmacological activities of Myrcia (Myrtaceae): A review of an aromatic and medicinal group of plants. Int J Mol Sei 2015; 16:23881-904.

Keyal, U., Huang, X, Bhatta, A. K. Antifungal effect of plant extract and essential oil. Chin J Integr Med 2016, DOI: 10.1007/s11655-016-2524-z.

Kramer, A., Assadian, 0. (Hrsg.) Wallhaußers Praxis der Sterilisation, Desinfektion and Antiseptik. 6th edition (2009, Georg Thieme Verlag, Stuttgart; Chapter 70, p. 887-891.

Rios, J. L., Recio, M. C. Medical plants and antimicrobial activity; J Ethnopharmacol 2005; 100:80-4.

Stewart, P. S. Antimicrobial tolerance in biofilm. Microbiol Spectr 2015; 3: 1-30.

The invention claimed is:

1. A method for an antimicrobial and/or antioxidative treatment of biofilms in an aqueous liquid, the method comprising:
    introducing into the aqueous liquid a composition which comprises:
    (a) a micelle forming solubilizate which comprises 5 to 40% by weight of at least one plant extract, 30 to 85% by weight of at least one emulsifier with an HLB value of 8 to 18, and water, and
    (b) 13 to 19% by weight $H_2O_2$ and 1 to 2.5% by weight L(+) lactic acid, wherein the aqueous liquid is not a human or animal body fluid.

2. The method of claim 1, wherein the at least one emulsifier comprises at least 80% by weight of polysorbates.

3. The method of claim 1, wherein the at least one plant extract is selected from the group consisting of extracts of spice plants or parts thereof, extracts of citrus plants or parts thereof, and combinations of these extracts.

4. The method of claim 3, wherein the at least one plant extract originates from olives, garlic, onions and/or citrus fruits.

5. The method of claim 1, wherein the micelles have a mean diameter of from 1 to 100 nm.

6. The method of claim 1, wherein the aqueous liquid is selected from the group consisting of process water, wastewater, surface water, and fill-up water.

7. The method of claim 6, wherein the process water is water in technical, medical technology, industrial or commercial installations.

8. The method of claim 6, wherein the process water is present as cooling water in a cooling water system or is treated for use in a cooling water system.

9. The method of claim 6, wherein the process water is present in water-conducting elements of beer brewing installations, circulating coolers and/or draft dispensers or is treated for use in beer brewing installations, circulating coolers and/or draft dispensers.

10. The method of claim 6, wherein the process water is present in water-conducting elements of medical technology installations or is treated for use in medical technology installations.

11. The method of claim 6, wherein the fill-up water is fill-up water for water basins, water tanks, domestic water conduits and hot water circuits.

12. The method of claim 1, wherein the composition is introduced in an amount effective to combat and prevent the growth of gram-positive and gram-negative bacteria, fungi and/or protozoa, which occur in biofilms in aqueous liquids.

13. The method of claim 12, wherein the composition is introduced into a water-conducting conduit containing the biofilm.

14. A composition for an antimicrobial and/or antioxidative treatment of biofilms in aqueous liquids, comprising:
(a) 78.5% to 86% by weight of a micelle-forming solubilizate which comprises 5 to 40% by weight of at least one plant extract, wherein the at least one plant extract originates from olives, garlic, onions and/or citrus fruits, 30 to 85% by weight of at least one emulsifier, wherein the at least one emulsifier comprises at least 80% by weight of polysorbates, and 10 to 40% by weight of water, and
(b) 13 to 19% by weight $H_2O_2$ and 1 to 2.5% by weight L(+) lactic acid.

15. The composition of claim 14, wherein the micelles have a mean diameter of from 1 to 100 nm.

16. The method of claim 1, wherein the micelles have a mean diameter of from 3 to 50 nm.

17. The method of claim 1, wherein the micelles have a mean diameter of from 5 to 20 nm.

18. The composition of claim 14, wherein the micelles have a mean diameter of from 3 to 50 nm.

19. The composition of claim 14, wherein the micelles have a mean diameter of from 5 to 20 nm.

20. The method of claim 6, wherein the process water is present as cooling water in a cooling water system for cooling towers, or is treated for use in a cooling water system for cooling towers.

21. The method of claim 12, wherein the composition is introduced into a water-conducting conduit containing the biofilm, wherein the water-conducting conduit is a cooling water conduit.

22. The method of claim 1, wherein the emulsifier comprises at least 80% by weight of polyoxyethylene (20) sorbitan monolaurate (polysorbate 20) and/or polyoxyethylene (20) sorbitan monooleate (polysorbate 80).

23. The composition of claim 14, wherein the emulsifier comprises at polyoxyethylene (20) sorbitan monolaurate (polysorbate 20) and/or polyoxyethylene (20) sorbitan monooleate (polysorbate 80).

* * * * *